United States Patent [19]

Copfer

[11] Patent Number: 4,463,511
[45] Date of Patent: Aug. 7, 1984

[54] FISHING ROD HOLDER FOR ICE FISHERMEN

[76] Inventor: Robert T. Copfer, 944 W. 9th St., Erie, Pa. 16502

[21] Appl. No.: 423,056

[22] Filed: Sep. 24, 1982

[51] Int. Cl.³ .............................................. A01K 97/10
[52] U.S. Cl. ..................................... 43/21.2; 43/19.2; 248/520
[58] Field of Search ......................... 43/21.2, 19.2, 17; 248/520, 529, 533, 538

[56] References Cited

U.S. PATENT DOCUMENTS

| 2,427,600 | 9/1947 | Hanke | 248/538 |
| 2,650,052 | 8/1953 | Bintz | 43/21.2 |
| 2,661,563 | 12/1953 | Adams | 43/21.2 |
| 2,663,962 | 12/1953 | King | 43/17 |
| 2,785,494 | 3/1957 | Eaton | 43/17 |
| 2,869,814 | 1/1959 | Hurlimann | 248/529 |
| 3,824,730 | 7/1974 | Johnson | 43/17 |

Primary Examiner—Nicholas P. Godici
Assistant Examiner—Thomas S. Mieczkowski
Attorney, Agent, or Firm—Charles L. Lovercheck; Wayne L. Lovercheck; Dale R. Lovercheck

[57] ABSTRACT

Fishing rod holder for ice fishermen or the like made up of a support having spaced support members and a notch in the top of each of the space support members to receive a pin attached to a fishing rod. A later length extending rubber band attached to the supports and the butt of the fishing rod rests on the rubber band so that when the fish pulls on the fish hook the rod will oscillate and jiggle the rod.

3 Claims, 6 Drawing Figures

FISHING ROD HOLDER FOR ICE FISHERMEN

OBJECTS OF THE INVENTION

It is an object of the invention to provide an improved fishing rod support for ice fishermen.

Another object of the invention is to provide an improved resilient support for a fish rod.

Another object of the invention is to provide a fish rod support that is simple in construction and economical to manufacture and simple and efficient to use.

Another object is to provide a fish rod support that will provide sensitivity to light bites of a fish, otherwise hard to detect.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

GENERAL DESCRIPTION OF THE DRAWINGS

DETAILED DESCRIPTION OF THE DRAWINGS

Figure 1:
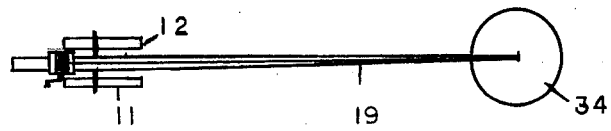
FIG. 1 is a top view of the fish rod according to the invention.
Figure 2:
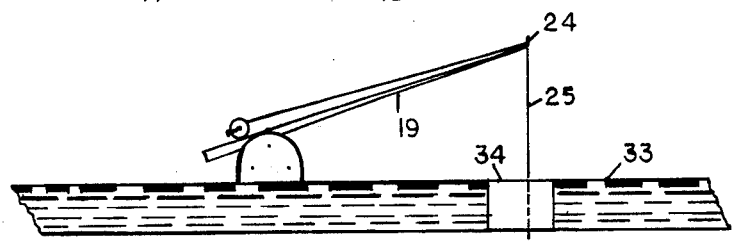
FIG. 2 is a side view of the fish rod shown extending through a hole in ice.
Figure 3:
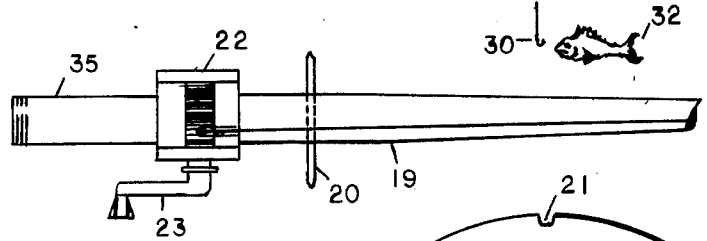
FIG. 3 is a large top view of the fish rod.
Figure 4:
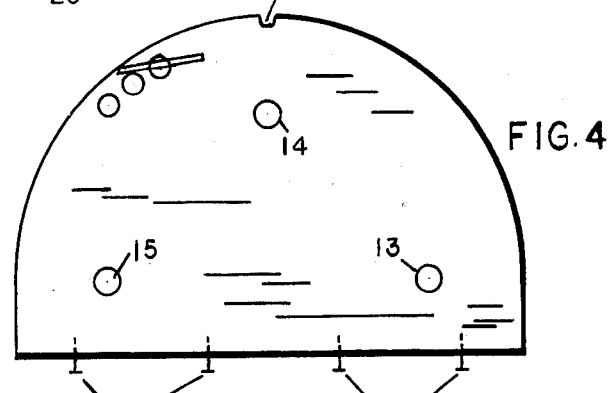
FIG. 4 is a side view of the fish rod support.
Figure 5:
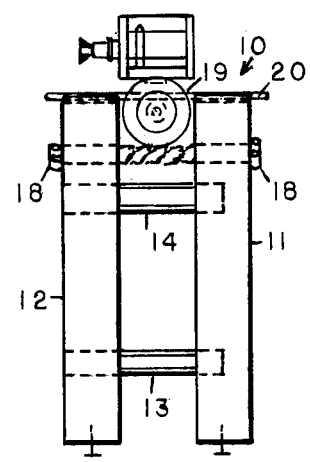
FIG. 5 is a rear view of the support.
Figure 6:
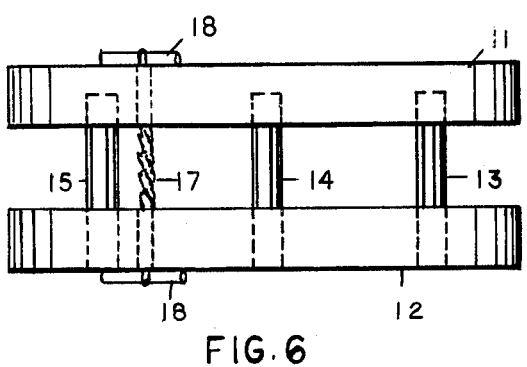
FIG. 6 is the top view of the support.

The rod holder is indicated generally at 10 and is made up of two side members 11 and 12. The side members are held together in spaced relation from each other by the dowel pins 13, 14, and 15 which extend into holes in the side supports 11 and 12 and may be attached thereto by a suitable cement. The rubber band 17 is supported between the support members 11 and 12 and a dowel 18 another dowel 19 are extended through the ends of the band. One of the dowels may be twisted to twist the rubber band up and increase the tension on it.

The fish rod 19 may be of any suitable variety and it has a pivot member 20 attached to it and extends out of it therefrom. The pivot 20 is spaced to where the tip of the rod from the center of gravity of the rod so that the butt on the rod will tend to swing down and a weight will rest on the rubber band 17. The rod has a usual type of reel 22 having a hand crank 23 and an eye 24 on the tip through which the line 25 passes. The line 25 has a hook 30 thereon of the usual type. The nails 31 extend downwardly from the sides 11 and 12. Therefore when a fish indicated at 32 strikes the hook 30 the tip of the rod 24 will be pulled downward toward the eyes 33. The hole 34 extends through it as indicated.

When the fish 32 relaxes his strike the weight of the butt 35 of the rod will move the rod downward on the rubber band 17. Thus the fish pulling on the hook 30 will cause the rod to oscillate.

The foregoing specification sets forth the invention in its preferred, practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A rod holder for use in fishing or the like comprising a base,
   said base comprising spaced support members adapted to rest on the supporting surface,
   means on said support member to receive a pivot means on a fishing rod,
   a resilient member extending between said support members and spaced from said pivot means,
   said support member being adapted to receive a pivot member attached to a fish rod and extending laterally therefrom and received therebetween with the handle of said rod resting on said resilient member,
   whereby said rod jiggles up and down when a fish strikes a hook on a line supported on said rod,
   said elongated member comprises a rubber band and a pin extending through each end of said rubber band which can be twisted to tighten said rubber band,
   means to hold the support comprises nails received in the bottom edges of said support members,
   the heads of said nails being spaced a substantial distance from said bottom surface and adapted to be disposed in a support.

2. The rod holder recited in claim 1 wherein said support members comprise an elongated resilient member extending between said support members and attached thereto.

3. The rod holder recited in claim 1 wherein said pivot member in said rod comprises a pin extending through said rod, the ends at said pivot member being adapted to rest in notches at the top of the surface of said support.

* * * * *